July 15, 1969

R. N. BATESON 3,455,167

PRESSURE MEASURING APPARATUS

Filed July 26, 1965

INVENTOR.
ROBERT N. BATESON
BY
*L. Mersey Lillehaugen*
ATTORNEY

July 15, 1969 R. N. BATESON 3,455,167
PRESSURE MEASURING APPARATUS
Filed July 26, 1965 2 Sheets-Sheet 2

INVENTOR.
ROBERT N. BATESON
BY
L. McRoy Lillehaugen
ATTORNEY

United States Patent Office 3,455,167
Patented July 15, 1969

3,455,167
PRESSURE MEASURING APPARATUS
Robert N. Bateson, Minneapolis, Minn., assignor to
General Mills, Inc., a corporation of Delaware
Filed July 26, 1965, Ser. No. 474,848
Int. Cl. G01l 7/16
U.S. Cl. 73—419                                    1 Claim

ABSTRACT OF THE DISCLOSURE

A device for measuring the pressure of a material within a container, as well as relative changes in the magnitude of the pressure. The device includes a movable force rod which has one end exposed to the material, and a second end which activates a force transmitter. Small axial movements of the rod, caused by changes in the pressure of the material, cause a force to be exerted against the transmitter which in turn transmits a signal to an appropriate device, which is indicative of the pressure of the material.

---

This invention relates to an apparatus for measuring pressure, and more particularly to an apparatus for determining the pressure of a substance or material within a containing structure, as well as any changes in the magnitude of pressure of the substance during a prescribed period of time. The invention is particularly adapted for use in measuring the pressure of a food composition or dough, while the dough is undergoing mechanical processing operations.

During the preparation of certain food products, the ingredients are processed in one or more operations to form the desired product. In some instances the ingredients are combined and mixed to form a fluid or slurry which is subsequently processed to form a food product; in some instances the ingredients are combined and mixed together to form a dough-like material which is likewise subsequently processed to form a food product; and in other instances the ingredients are combined and mixed to form a substance or material which ranges in consistency from a fluid or slurry to a highly viscous plasticized dough. Regardless of the consistency of the composition, the ingredients often undergo several processing steps, such as mixing, cooking, puffing, cutting, drying, and the like. During one or more of these steps pressures are created which must be observed. Moreover, in many instances the ingredients must be transferred in one form or another to different locations within the processing area; pressures are likewise often produced and/or used during the conveying step as well. In many instances it is essential that means be provided for measuring the existing pressure at one or more points in the processing operation.

One specific type of equipment which is now being used in many food processing operations in a plant is an extruder in which the ingredients are mixed, blended, cooked, and ultimately forced through a die to form a rope-like extrudate. During the extrusion process pressures are created within the extruder which aid in forming an extrudate having the desired characteristics. It has been found that optimum results are obtained if the pressure is maintained within a prescribed range. If the pressure drops below a predetermined minimum, steps must be taken to increase the pressure to at least the prescribed minimum. On the other hand, if the pressure increases beyond a predetermined maximum, steps must be taken to decrease the pressure. Pressure measuring devices are used to indicate the magnitude of the pressure within the extruder. Devices of this type might include a gauge which provides a direct reading of the pressure; they might include means for operating a pressure recorder which records the pressure on an appropriate chart; or they might accomplish more than one objective.

According to the known state of the art, devices now available for measuring the pressures developed in food processing operations are not entirely satisfactory as they have disadvantages which seriously limit their effectiveness and reliability. For instance, strain gauge transducers have been used for measuring the pressure in an extruder. It has been found however, that strain gauge transducers are not especially suited for plant operations because they are delicate instruments which are easily damaged by overpressure, or excessive torque during installation; they often require water or air cooling; and they are expensive to purchase and repair. Another type of measuring device currently used is a grease-filled gauge. This type of device often requires the introduction of grease periodically to clear the passage leading to the extruder; the introduction of grease into a food product however, is often very undesirable; furthermore, it has been found that grease gauges have not always given reliable results. Electronic measuring devices have also been used; however, they are relatively complex instruments, they are expensive to purchase, and costly to repair. Moreover, it has been found that some measuring devices are extremely sensitive to temperature variations; therefore, means must be provided for preventing temperature variations from affecting the accuracy and reliability of the instrument.

Accordingly, one object of the present invention is to provide an improved apparatus for measuring the pressure of a substance within a confined area.

Another object is to provide an apparatus for measuring the pressure of a substance within a containing structure, a portion of said apparatus being exposed to the pressure of the susbtance, said apparatus being associated with a device which provides an indication of the magnitude of the pressure.

A further object is to provide a measuring apparatus having a portion thereof exposed to a pressurized substance, the apparatus provided with sealing means for preventing any of the pressurized substance from entering the apparatus and affecting the operation of the apparatus.

A still further object is to provide an apparatus for determining the pressure of a pressurized medium, as well as any changes in said pressure, which is simple and rugged in construction, inexpensive to manufacture, reliable in its operation, and unaffected by temperature variations.

Another object is to provide an apparatus for measuring the pressure of a plasticized food dough composition while it is being processed in an extrusion apparatus.

Other objects and advantages of this invention will become apparent from a consideration of the following specification and accompanying drawings. Before proceeding with a detailed description of the invention however, a brief description of it will be presented.

Briefly, the measuring apparatus includes an elongate tubular body which is secured to a containing structure. An elongate force rod is movably mounted within the tubular body, one end of the rod is exposed to the pressure of a substance within the containing structure, and the other end of the force rod contacts and activates a force transmitter. The force transmitter measures small forces exerted by the force rod against it and transmits a signal to a gauge, recording device, or the like. The apparatus is designed so that a maximum movement of 0.002 of an inch by the force rod, gives a full reading of the pressure of the material from zero to a prescribed maximum magnitude. Appropriate seals are provided for preventing any of the substance from entering the tubular body and adversely affecting the operation and reliability of the apparatus.

The invention will best be understood by reference to the following drawings wherein.

Figure 1:
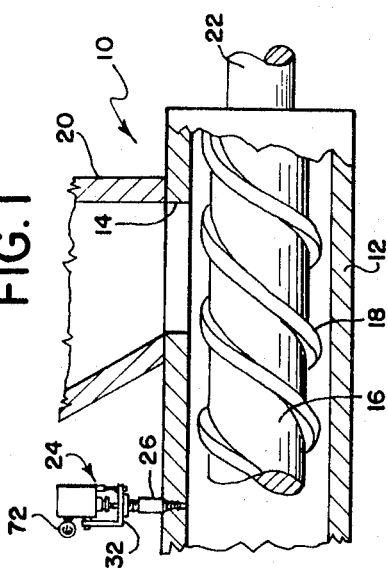
FIGURE 1 is a partial sectional view showing a pressure measuring apparatus attached to the barrel of an extruder.

FIG. 1 illustrates an extrusion apparatus 10 for forming an extrudate out of a mixture of food ingredients. The extrusion apparatus includes a cylindrical barrel 12 with an opening 14 therein, a screw 16 with flights 18, a hopper 20, and a shaft 22. As the shaft 22 is caused to rotate, by means not shown in the drawings, the screw 16 is caused to rotate about its longitudinal axis. A pressure measuring apparatus designated generally by reference numeral 24, is shown mounted within the barrel 12.

Figure 3:
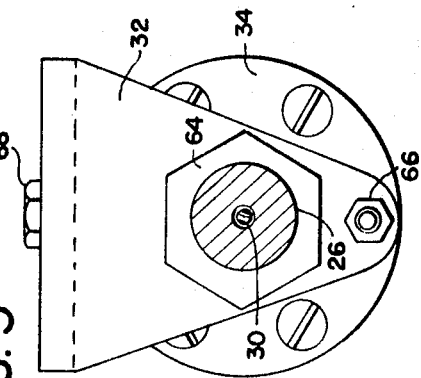
FIG. 3 is a sectional view taken along line 3—3 of FIG. 2.
Figure 2:
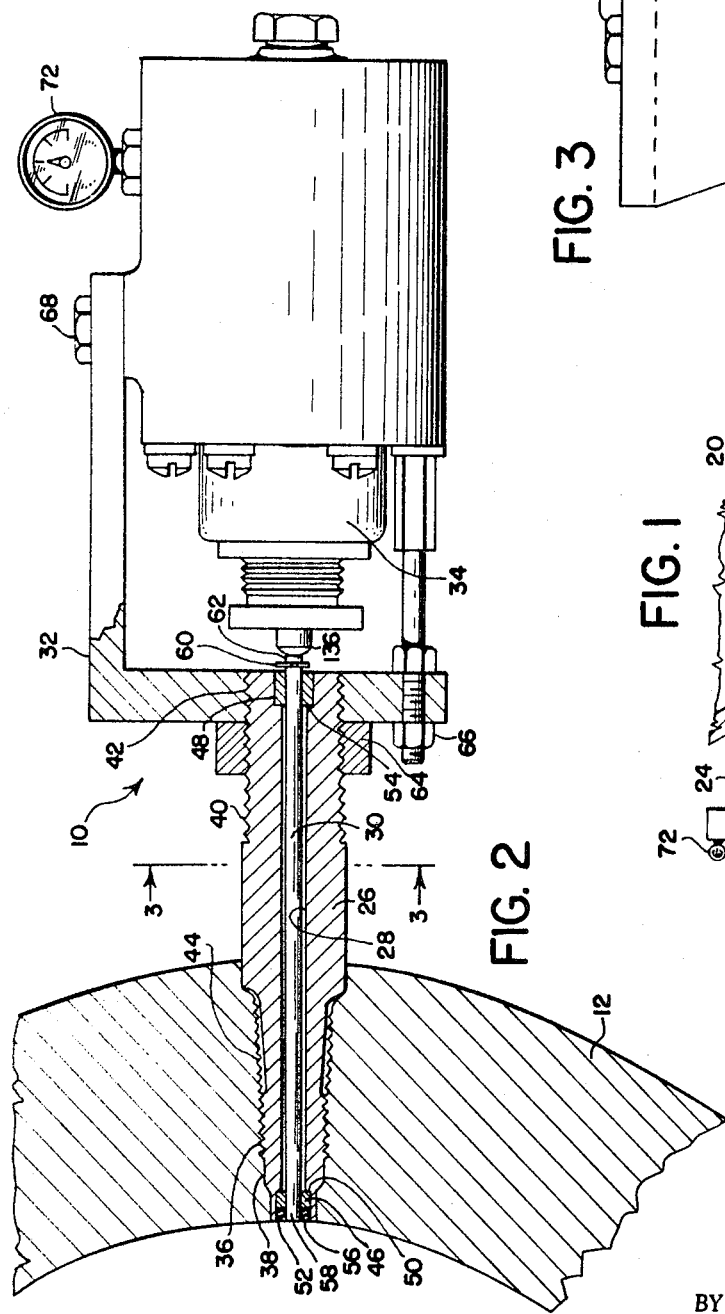
FIG. 2 is an enlarged side elevational view, with parts broken away, of the pressure measuring apparatus depicted in FIG. 1.

FIG. 2 illustrates the measuring apparatus 24 in greater detail. The apparatus includes an elongate member 26 having a bore or channel 28 therein, a force rod 30, a support bracket 32, and a force transmitter 34. The tubular member 26 is provided with a first threaded portion 36 adjacent a first end 38, and a second threaded portion 40 adjacent its second end 42. The tubular member is secured to the barrel 12 of the extruder body 10 by mounting it within an internally threaded bore 44 in the barrel 12. The bore 44 is designed so that it conforms to the general shape of the member 26.

The force rod 30 is mounted within the bore 28 so that its longitudinal axis is substantially coaxial with the longitudinal axis of the member 26. The force rod is axially movable within the bore 28, and it is supported therein by means of a bearing 46 mounted adjacent the first end 38 of the tubular member 26, and a second bearing 48 mounted adjacent the second end 42 of the member 26. The bearing 46 abuts against a shoulder 50 in such a manner that an annular cavity 52 is formed, and the bearing 48 abuts against a shoulder 54; both bearings are press fit into their respective position so that they will not separate from the tubular member. An O-ring seal 56 is positioned within the cavity 52 adjacent a first end 58 of the force rod 30 and it prevents any material from entering the bore 28. A snap ring 60 is attached to the other end 62 of the force rod 30, and it limits the axial movement of the force rod to the left, as viewed in FIG. 2. As shown in FIG. 2, the end 58 of the force rod 30 is exposed to the pressure of the material within the barrel of the extruder.

The support bracket 32 is threadedly mounted on the second end 42 of the tubular member. A lock-nut 64 is provided for locking the bracket in place when a desired position is attained.

The force transmitter 34 is operatively connected to the tubular member 26 by means of the support bracket 32.

A bolt and nut assembly 66, and a bolt 68 connect the transmitter 34 to the support bracket 32 so that it is positioned relative to the force rod 30 in a prescribed manner.

The tubular member 26 and the force rod 30 are designed so that the force rod moves axially within the tubular member 26 a maximum distance of 0.002 inch, in measuring the pressure of a substance within the extruder 10 from zero to a predetermined maximum magnitude. Since only a small axial movement of the force rod is encountered, it is essential that appropriate means be provided for accurately measuring the force exerted against the transmitter, and thereafter transmitting a signal to appropriate indicating means. It has been found that a pneumatic force transmitter, similar to that manufactured by Moore Product Company of Philadelphia, Pa., will measure a force exerted against it and transmit a signal indicative of the pressure being measured; one such device for example is Model 415 Nullmatic Force Transmitter. Generally, this instrument uses a null actuated force balance system which requires only 0.002 of an inch motion from zero to 100% force balance. The force transmitter 34 illustrated in FIGS. 2 and 6 is such a device.

Figure 6:
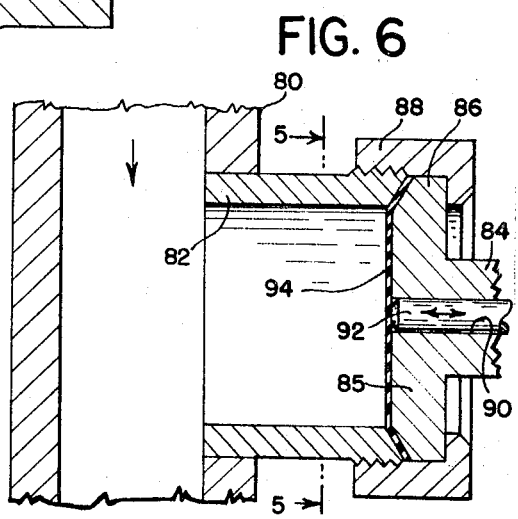
FIG. 6 is an enlarged sectional view of the force transmitter shown in FIG. 2.

FIG. 6 illustrates the force transmitter 34 in greater detail. Briefly, the aforementioned commercially available transmitter includes a first section or first end housing 100, a second section or damper housing 102, a third section or pilot ring 104, a fourth section or ring assembly 106, and a fifth section or second end housing 108. The transmitter is effectively partitioned into three zones by means of a first diaphragm 110 interposed between the end housing 100 and the damper housing 102, and a second diaphragm 112 interposed between the damper housing 102 and the pilot ring 104. A first chamber 114 is formed in the damper housing 102, and it is filled with a damping fluid in such a manner that the fluid pressure exerts a force against the diaphragm 112. A second chamber 116 is formed between the diaphragm 112 and a hollowed portion of the pilot ring 104; a third chamber 118 is formed between the pilot ring 104 and a diaphragm 120; a fourth chamber 122 is formed between a diaphragm 124 and a hollowed portion in the second end housing 108; and a fifth chamber 126 is formed between the diaphragms 120 and 124. The chambers 116, 118, 122 and 126 are maintained at one or more different pressures by means of air admitted under pressure through an inlet 128. The pressurized air within the chamber 116 exerts a force against the diaphragm 112, which under normal conditions balances the force exerted against the diaphragm 112 by the pressurized fluid within the chamber 114. An outlet 130 is provided in the second end housing 108 and it is in communication with the chamber 122. A pressure gauge (not shown) or other appropriate measuring means is attached to the transmitter at 130. An exhaust vent 132, which is in communication with the chamber 126, permits air to pass to the atmosphere under certain conditions. A loading plunger or push rod 134, having ends 136 and 138, is slidably mounted within the end housing 100 in such a manner that the end 138 abuts against a disk 140. The disk 140 is positioned adjacent the diaphragm 110, and as the loading plunger or push rod 134 is caused to move axially, it causes the diaphragm 110 to flex. As noted in FIG. 2, the transmitter 34 is positioned relative to the tubular member 26 so that its loading plunger 136 is positioned proximate the end 62 of the force rod 30.

In operation, as the loading plunger or push rod 134 of the transmitter is caused to move axially, it exerts a force against the diaphragm 110, which changes the pressure of the damping fluid within the chamber 114; consequently, the pressure exerted against the diaphragm 112 changes. As a change in the damping fluid occurs, the air pressure within the chamber 116 must change in order to compensate for the fluid pressure change, and in order to maintain substantially equal pressures on opposite sides of the diaphragm 112. Changes in the air pressure are indicated on the gauge attached to the second housing 108 in a manner well known to those familiar with the Moore transmitters.

As shown in FIG. 2, a gauge 72 is secured to the transmitter by appropriate means, and it is calibrated to indicate the process pressure directly in response to the transmission of a signal from the force transmitter 34. If desired of course, difference types of guages might be used as well, such as special calibrated gauges, or gauges which require the use of a calibration curve to determine the pressure within the extruder. Moreover, if desired, in lieu of a gauge, means might be provided for operatively connecting the transmitter 34 to recording means (not shown) whereby a record of the pressure during a prescribed period of time might be made. Furthermore, if desired both a gauge and a recording device might be used.

In operation, ingredients for forming a food dough composition are admitted into the extruder 10 from the hopper 20 through the opening 14. As the ingredients are mixed and blended within the extruder, pressures are created within the barrel 12. One or more pressure measuring devices 24 might be positioned along the barrel for determining the pressure of the dough during various stages of the processing operation. As the dough passes through the extruder it comes into contact with the exposed end 58 of the force rod 30. The process pressure produces a force on the rod equal to the dough pressure times the rod area. For example, if the diameter of the force rod is 0.125 of an inch and the process pressure is 4500 p.s.i., the force produced on the end of the force rod will be 55 pounds. This results in a transmitter output pressure which can be measured in pounds per square inch on the gauge 72. As the pressure increases, the force rod 30 is caused to move axially within the bore 28 of the tubular member 26 toward the loading plunger 136; the rod 30 transmits the force of the pressure to the plunger, the output pressure being proportional to the process pressure and the rod area. In short, the output pressure of the transmitter is proportional to the force applied to the loading plunger and hence proportional to the dough pressure. Since the force rod 30 moves a maximum of 0.002 of an inch, the loading plunger 136 likewise moves only 0.002 of an inch from zero pressure to maximum pressure. The force transmitter measures the force on the loading plunger and transmits a pneumatic output signal to the gauge 72, which is calibrated to give a visual indication of the pressure.

Since a maximum movement of only 0.002 of an inch of the force rod 30 is encountered, it is of utmost importance that the dough be prevented from entering the bore 28 and filling the annular space between the force rod 30 and the tubular member 26. If dough is permitted to enter this annular space, it may eventually freeze the rod 30 and prevent it from moving axially within the bore 28. If the force rod cannot move freely, accurate pressure reading will not be obtained. Thus, the seal 56 prevents any material whatsoever from entering the bore 28.

Figure 4:
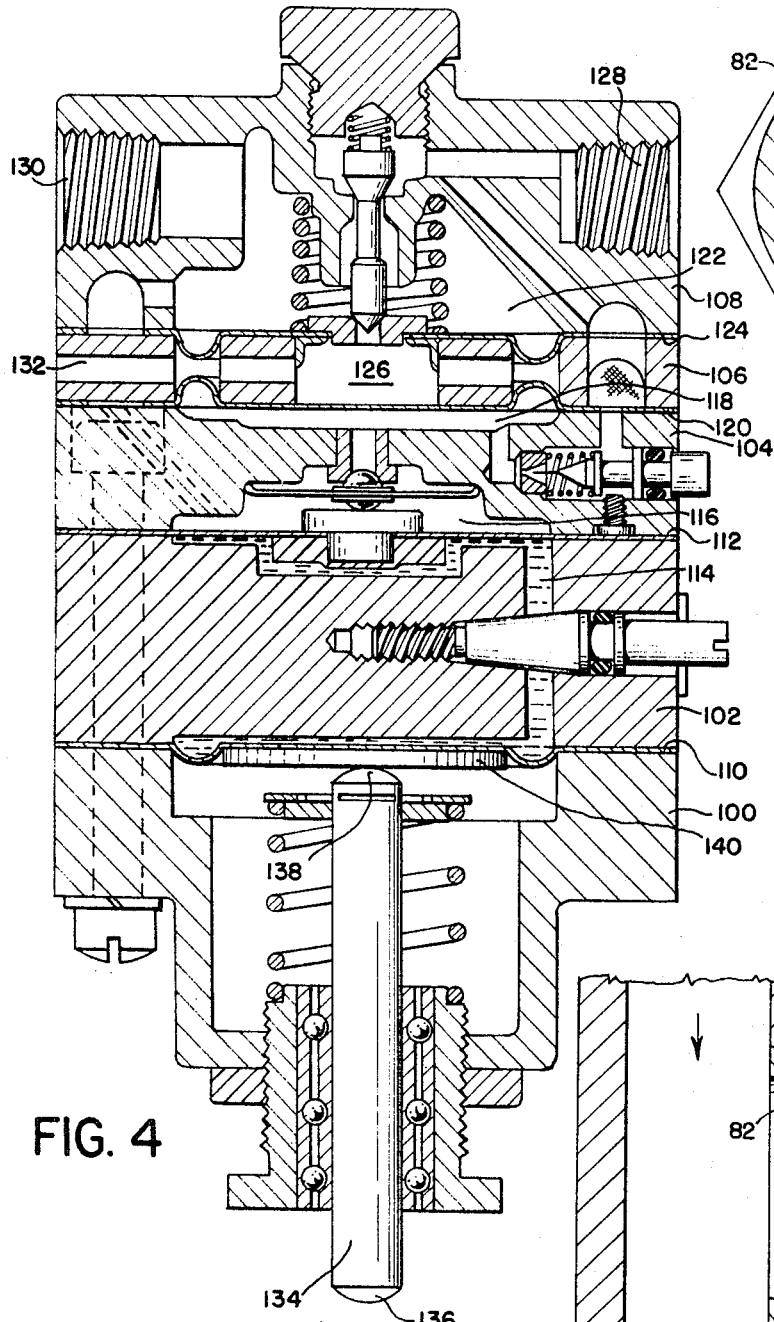
FIG. 4 is an enlarged sectional view illustrating another embodiment of the invention.
Figure 5:
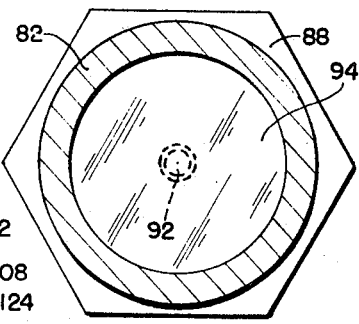
FIG. 5 is a sectional view taken along line 5—5 of FIG. 4.

FIG. 4 illustrates a different embodiment of the invention. In this embodiment the measuring apparatus is attached to a pipe or conduit 80 in which a slurry of fluid can flow. An extension 82 is secured to the conduit 80 so that its axis is normal to the axis of the conduit. An elongate member 84 having a head portion or ferrule 86 integrally attached to one end, is secured to the extension 82 and the conduit 80 by means of a lock-nut 88. The member 84 is provided with a bore or channel 90, and a force rod 92 is slidably positioned within the bore. A force transmitter, not shown, is secured to the other end of the tubular member in the same manner as that shown and described in conjunction with FIG. 2. A thin membrane 94 is placed across the surface of the ferrule so that it covers the entrance to the duct 90 in the member 84. The membrane 94 is maintained in position by clamping it betweeen the end of the extension 82 and the ferrule 86 as shown in FIG. 4. By tightening the lock nut 88, the components are maintained in assembled relationship. This embodiment is particularly useful in operations wherein the material being processed is a fluid or slurry.

In many food processing operations sanitation requirements make it imperative that none of the material being processed enter the duct 90. The membrane 94 provides a seal which prevents any of the material, such as a fluid or slurry, from entering the duct 90. As the fluid or slurry flows through the conduit 80, the pressure of the fluid exerts a force against the membrane 94 and the end of the force rod 92, thus causing the force rod 92 to move to the right, as shown in FIG. 4. Axial movement of the force rod is detected by the force transmitter in the same manner described above in connection with FIG. 2, and the magnitude of the pressure within the conduit can be determined.

In some applications it has been found that an adequate seal has been provided by merely covering the ferrule 86 and the exposed end of the force rod 92 with a coating compound, such as a silicon rubber coating. Since only a slight axial movement of the force rod is encountered, such a sealing arrangement might also be satisfactorily used.

The measuring apparatus described hereinbefore has been found to be particularly useful for measuring pressures created within a containing structure during food processing operations. The use of a pneumatic force transmitter in combination with the other structure described, results in an apparatus which can detect extremely small axial movements of a force rod exposed to the pressure of a food material by measuring the force required to move the force rod, and transmit a signal to a gauge, recorder, or the like, which will indicate the magnitude of the pressure of the material. Relatively small axial movements of the force rod permit the use of sealing methods for assuring that none of the food material enters the bore surrounding the force rod. As pointed out above, admission of a food material into the bore might freeze the rod in a fixed position thereby rendering the apparatus inoperable, or it might result in contaminating the processing equipment to such an extent that the material being processed becomes unsanitary and unfit for use as a food product. The present invention provides a simple, accurate, and reliable device, which is not affected by temperature variations of the substance being processed or the processing equipment, for measuring pressures produced during processing operations.

In the above description and attached drawings, a disclosure of the principles of this invention is presented, together with some of the embodiments by which the invention may be carried out.

Now therefore I claim:

1. An apparatus for measuring the pressure of a material within a containing structure comprising an elongate tubular member, a first end of the tubular member including a ferrule adapted to be secured to the containing structure, said ferrule including a surface, means for securing said tubular member to be the containing structure, an elongate force rod movably mounted within said tubular member, the first end of said force rod being substantially flush with the first end of the tubular member, said first end of said force rod being directly exposed to the pressure of said material, sealing means proximate said first end for preventing any of said material from entering the tubular member, said sealing means including flexible means secured to the first end of the tubular member in such a manner that it covers the first end of the force rod, said flexible means being a flexible coating of material positioned relative to the surface of said ferrule so that it covers the opening in the tubular member, the first end of the force rod being substantially flush with the surface of the ferrule, said force rod being caused to move axially within the tubular member in response to a change in relative pressure of the material, means operatively connected to the second end of said force rod for sensing relative movements of said rod, said means providing an indication of the pressure of the material, maximum movement of 0.002 of an inch by the force rod giving a full reading of the pressure of the material from zero to a maximum magnitude.

References Cited

UNITED STATES PATENTS

| | | | |
|---|---|---|---|
| 2,626,464 | 1/1953 | Mennesson | 33—172 |
| 2,669,246 | 2/1954 | Segerstad | 33—147 XR |
| 2,748,602 | 6/1956 | Weber | 73—419 XR |
| 3,247,824 | 4/1966 | Rodgers | 73—419 XR |

LOUIS R. PRINCE, Primary Examiner

DONALD O. WOODIEL, Assistant Examiner